No. 12,500. REISSUED JUNE 26, 1906.

J. NASER.

BURGLAR ALARM.

APPLICATION FILED APR. 4, 1906.

Witnesses:
C. H. Tibbetts
C. T. Chase

Inventor:
James Naser,
by Byrnes, Townsend & Innerstan,
Att'ys.

UNITED STATES PATENT OFFICE.

JAMES NASER, OF NEW YORK, N. Y., ASSIGNOR TO SURETY ALARM COMPANY, A CORPORATION OF MAINE.

BURGLAR-ALARM.

No. 12,500. Specification of Reissued Letters Patent. Reissued June 26, 1906.

Original No. 788,788, dated May 2, 1905. Application for reissue filed April 4, 1906. Serial No. 309,941.

*To all whom it may concern:*

Be it known that I, JAMES NASER, a citizen of the United States, residing at New York city, in the county of New York and State of New York, have invented certain new and useful Improvements in Burglar-Alarms, of which the following is a specification.

This invention relates to burglar-alarms of the wedge type, which not only sound an alarm when an attempt is made to open the door, window, or the like, but at the same time form a wedge adapted to resist such opening. Such alarms have hitherto been constructed from sheet metal, two plates being hinged together at an acute angle to form a wedge, the movement of one plate caused by an attempt to open the door to which it is applied causing an alarm-bell to ring, a third hinged plate or other medium transferring the movement to the trigger of the bell. Owing to the weakness of the sheet-metal construction, such alarms have to be made of inconveniently-large dimensions to attain anything like practical strength, and even then they are very easily damaged and do not offer much resistance against a persistent attempt to open the door.

The object of the present invention is to provide a very strong burglar-alarm of the wedge type, which while being of comparatively small dimensions is yet effective both in giving the alarm and in entirely resisting any attempt to open the door.

The invention consists in an alarm of the wedge type comprising a wedge of solid or nearly solid material supported upon a base-plate carrying an alarm-bell, the wedge-block being attached to the plate and suitably guided in such a manner that it is capable of a slight sliding movement relatively thereto, so that when moved by the door or the like it actuates the trigger of the alarm-bell. Such block is also preferably formed on its inclined face with a roughened or other friction surface, and the base-plate is provided on its under surface with strong rearwardly-extending points.

The invention will now be described with reference to the accompanying drawings, in which—

Figure 1:
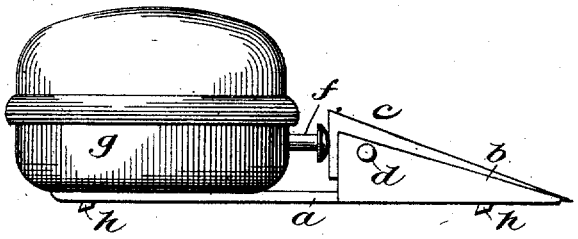
Figure 2:
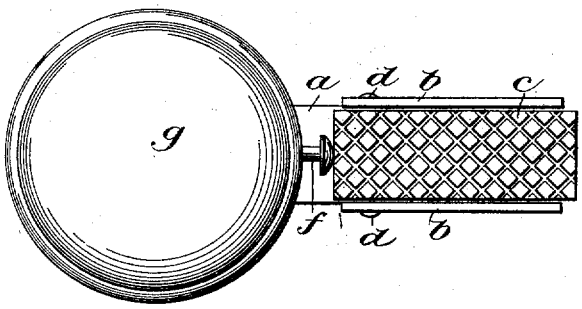
Figure 3:
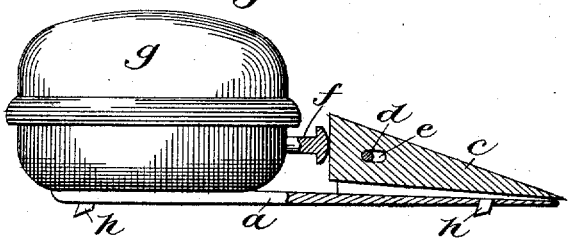

Figure 1 shows a side elevation of a preferred form of burglar or other alarm. Fig. 2 shows a plan, and Fig. 3 shows an elevation, partly in section.

In carrying out the invention according to one modification a strong base-plate *a* is provided with a spring-motor-actuated or equivalent alarm-bell *g* at one end, while its other end is formed with two triangular side ears *b*, bent up at right angles to form guides. Between the guides *b* a very strong wedge-block *c* is inserted, the wedge being of solid or nearly-solid material. It is free to slide slightly between the guides, the amount of movement being limited by a cross-pin *d*, passing transversely through a slot *e* (see Fig. 3) in the block and carried by the side guides *b*. The slot *e* is made of sufficient length to enable the block or wedge *c* to be pushed far enough to release the trigger *f* of the bell *g* and may be of sufficient depth to enable the block to rest on the base-plate, so as to relieve the pin from all downward pressure. The inclined face of the block *c* is preferably cross-cut or scored, as shown, or otherwise roughened to present a frictional surface to the door. The under surface of the base-plate is fitted with sharp strong studs *h*, extending rearwardly, so as to prevent the alarm sliding when an attempt is made to open the door.

In use the alarm is placed in close proximity to the door, window, or the like, with the thin end of its wedge-block *c* under the edge of the door or other moving member. Any attempt to open the door causes the block to slide rearwardly and to release the trigger *f* of the bell *g*, and thereby sound an alarm. Further attempted movement of the door, however, only results in the door becoming firmly wedged, the strong solid block effectively resisting opening of the door and wthout damage to itself. The solid form of block naturally enables comparatively small dimensions to be adopted. So long as the door is being pushed the alarm continues to ring, and if wedged firmly it will not cease. Means may be provided, if desired, to retain the wedge in the ringing position even after the door has been closed again.

I claim—

1. A door-check and alarm, comprising a base-plate, a wedge provided with an elongated slot therethrough, guides laterally disposed with respect to said wedge, a pin penetrating said slot and secured to said guides, an alarm, and a trigger therefor incapable of independently operating the said alarm and normally operative with respect thereto adapted to be operated by longitudinal movement of said wedge, substantially as described.

2. A door-check and alarm, comprising a base-plate, a wedge provided with a slot therethrough, guides laterally disposed with respect to said wedge, a pin penetrating said slot and secured to said guides, an alarm-bell, a trigger therefor incapable of independently operating the said alarm and normally operative with respect thereto adapted to be operated by longitudinal movement of said wedge, and means for maintaining the base-plate in an operative position, substantially as described.

3. A door-check and alarm, comprising a block having a flat under face and an inclined upper face, a base-plate having side wings to form guides for the block, means for loosely securing the block between said wings to permit relative longitudinal movement and an alarm-bell on the base-plate having its trigger in contact with said block, substantially as described.

4. A door-check and alarm, comprising a block having a flat under face and an inclined upper face, a base-plate having side wings inclined to conform to the shape of the block, said block having a transverse elongated slot therein, a pin passing through said slot and supported by the wings so as to permit relative movement of the block and an alarm-bell on the base-plate having its trigger in contact with the block, substantially as described.

5. A door-check and alarm, comprising a wedge-shaped block having a roughened inclined surface, a base-plate having side wings to form guides for said block, a transverse elongated slot through the block, a pin passing through said slot and supported by the guide-wings so as to permit relative longitudinal movement of the block, an alarm-bell on the plate having its trigger in contact with said block, and rearwardly-inclined spikes on the under surface of the base-plate, substantially as described.

In testimony whereof I hereby affix my signature in presence of two witnesses.

JAMES NASER.

Witnesses:
J. M. WILSON,
H. V. CURRAN.